Sept. 6, 1949.   J. C. HOBBS   2,480,858
PIPE HINGE

Filed July 13, 1945   2 Sheets-Sheet 1

INVENTOR.
JAMES CLARENCE HOBBS
BY
Richey Watts
ATTORNEYS

Sept. 6, 1949. J. C. HOBBS 2,480,858
PIPE HINGE
Filed July 13, 1945 2 Sheets-Sheet 2

INVENTOR.
JAMES CLARENCE HOBBS
BY
Richey & Watts
ATTORNEYS

Patented Sept. 6, 1949

2,480,858

UNITED STATES PATENT OFFICE 2,480,858

PIPE HINGE

James Clarence Hobbs, Painesville, Ohio

Application July 13, 1945, Serial No. 604,859

2 Claims. (Cl. 285—96.3)

The present invention relates generally to pipe joints, and particularly to a new pipe hinge for pipes carrying fluids at high temperatures and pressures.

In ships, and in many other places, it is necessary to conduct fluids at high temperatures and pressures thru piping anchored at each end to relatively movable bodies. For example, steam is conducted from a superheater to a turbine thru piping which is anchored at one end to the superheater and at the other end to the turbine. Since the pipe expands and contracts, depending on the temperature of fluid therewithin, and since the anchor points may move relative to each other, it is important that the piping should accommodate both such expansion and relative movement of its anchor points without breakage or leakage.

Efforts have been made heretofore to accommodate such movements by the use of flexible bends in the pipe. For low pressure, low temperature fluids flexible metallic tubing may be used but when high pressure, high temperature fluids are involved which require thick wall pipe, the piping is provided with several right angled bends between its anchored ends. In order that the piping may have the necessary number of such bends it may be two or three times as long as would be necessary if such bends could be eliminated and as a result the weight of the piping and its space requirements and costs are large, additional hangers are required for the piping and, in the case of ships, the cargo carrying capacity and speed or cruising range are decreased in accordance with the weight and space occupied by the excess piping.

The present invention aims to avoid the disadvantages of the prior constructions and to provide piping which is capable of carrying high pressure, high temperature fluids between anchor points, is of ample strength for the fluid it is to carry, is of minimum weight, requires a minimum amount of space, is of minimum initial cost, and is easy to erect and dismantle for inspection, cleaning or replacement. These aims are attained by the present invention, certain embodiments of which are hereinafter described and shown in the drawings which accompany this specification and in which Fig. 1 is a side elevational view of piping embodying the present invention and connecting a superheater and a turbine;

Figure 1:
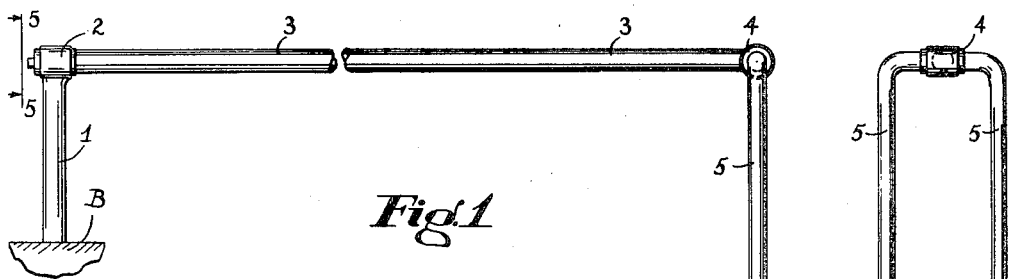
Figures 2, 3:
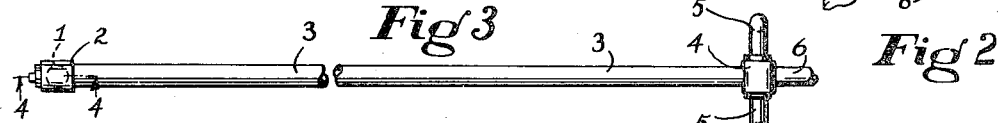
Fig. 2 is a righthand elevational view of piping of Fig. 1.
Fig. 3 is a top plan view of the piping of Fig. 1.
Figure 4:
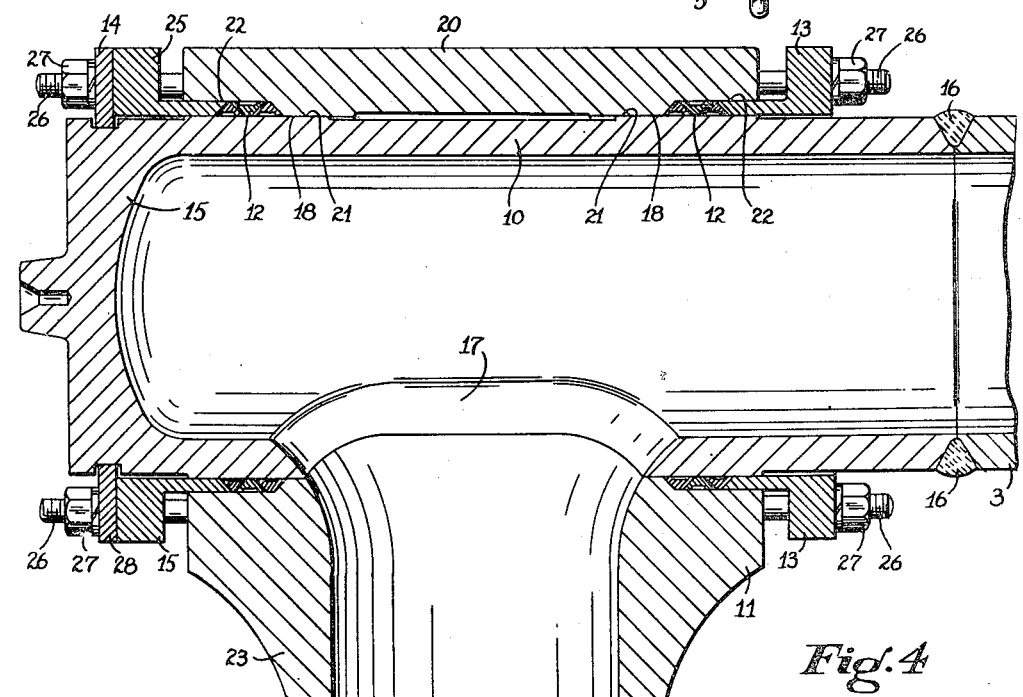
Fig. 4 is a cross-sectional view taken on line 4—4 of Fig. 3.

Figs. 1, 2 and 3 show piping embodying pipe hinges of the present invention and anchored at its ends to a superheater designated generally at A and to a turbine designated generally at B. This piping includes pipe 1 connected to the turbine B and to hinge 2, pipe 3 connecting hinge 2 to hinge 4, and tubes 5 connecting hinge 4 to a corresponding hinge 4a which in turn is connected by pipe 6 to superheater A. Since pipes 1, 3, and 6 and tubes 5 are straight except for short end bends, and are not subjected to bending forces and reactions and stresses resulting therefrom, their walls may be of minimum thickness, depending on the pressures and temperatures to which they are subjected to use. For these reasons pipes 1, 3, and 6 and tubes 5 may be of the minimum weight and cost and will occupy a minimum amount of space. Due to the presence of the pipe hinges, pipes 1, 3, and 6 and tubes 5 are substantially free from the bending or distorting forces traceable to expansion and contraction of these pipes under varying temperature conditions and relative movement of the anchor points A and B.

Pipe hinge 2 is a single unit type. It comprises a pipe 10, sleeve 11, packing 12, packing retaining means 13, and means 14 for preventing relative axial movement of the pipe and sleeve while permitting relative rotational movement of the pipe and sleeve.

Pipe 10 is closed at one end, as is indicated at 15 and at its other end may be attached to pipe 3, as indicated by weld metal 16. The side wall of pipe 10 near the closed end thereof is provided with an elongated opening 17. At each side of opening 17 pipe 10 has outwardly projecting annular portions provided with outer cylindrical bearing surfaces 18. Preferably, these surfaces are truly cylindrical and are highly polished and chrome plated. An annular groove 19 is formed in the outer surface of pipe 10 near its closed end 15 for a purpose presently to appear.

The sleeve 11 includes a cylindrical portion 20 which surrounds pipe 10 and has inwardly projecting annular portions provided with inner cylindrical bearing surfaces 21 disposed to cooperate with the outer bearing surfaces 18 of pipe 10; and between the ends of sleeve 20 and surfaces 21 the sleeve is cut away to provide inner cylindrical surfaces 22 which are spaced apart radially from the outer surface of pipe 10 therewithin. Sleeve 11 also includes an integral, hollow, pipe-like portion 23, the interior of which communicates with the interior of pipe 10 thru opening 17. The free end of projection 23 may be attached to the adjacent end of pipe 1 as by weld metal 24.

Packing 12 is disposed in the spaces between surfaces 12 of cylindrical portion 20 of the sleeve and the outer bearing surfaces of pipe 10 and the packing are maintained in fluid sealing contact with those surfaces by retaining rings 25 which are carried by bolts 26 projecting from the ends of the sleeves and nuts 27 on those bolts. Member 28, which may be a segmental ring of two or more parts, projects into groove 19 of pipe 10 and is retained in position relative to sleeve 11 by bolts 26 which pass therethru and nuts 27 which press the ring against the packing retaining ring 25.

It will be understood from the foregoing description and the drawings of pipe hinge 2 that member 28, in cooperation with groove 19, will permit relative rotational movement but prevent relative axial movement of pipe 10 and sleeve 11. It will also be understood that the packing retainers 13 will rotate with the sleeve rather than with pipe 10, and that the packing 12 will tend to rotate with the sleeve rather than with pipe 10, due to the fact that the packing is engaged on three sides by the sleeve and on only one side by the pipe. This tendency of the packing to rotate with the sleeve is promoted by reason of the fact that each of the outer bearing surfaces 18 of the pipe is wider, measured lengthwise of the pipe, than the combined width of the bearing surface 21 in engagement therewith and the packing 12. Thus, the packing bears against the finished bearing surface 21 on the pipe and on the cut-away surface 22 of the sleeve. This arrangement of parts insures continued sealing of the ends of the cylindrical portion of sleeve 11 against leakage therethru of fluid under pressure in pipe 10 and permits adjustments to be made for wear or a different range of pressure.

Figure 6:
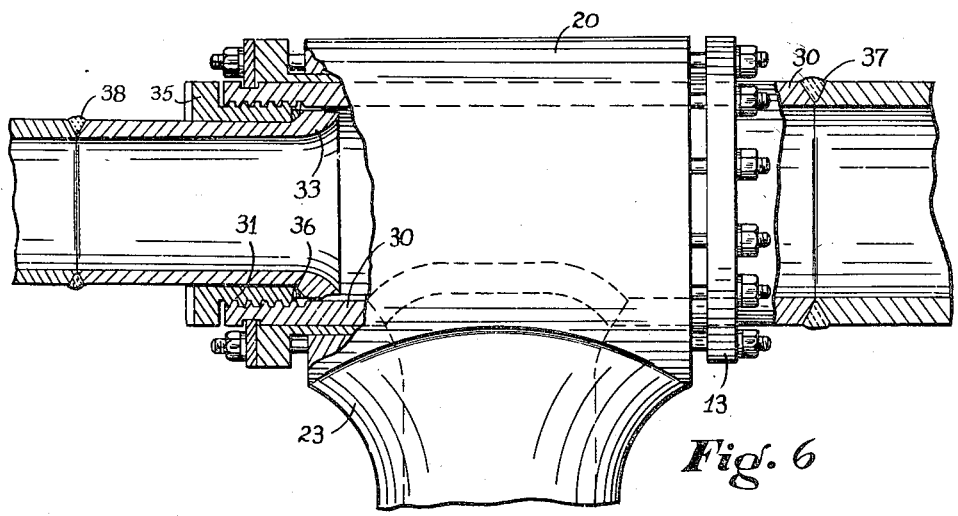
Fig. 6 is a view similar to Fig. 4 but taken on line 6—6 of Fig. 2.
Figure 5:
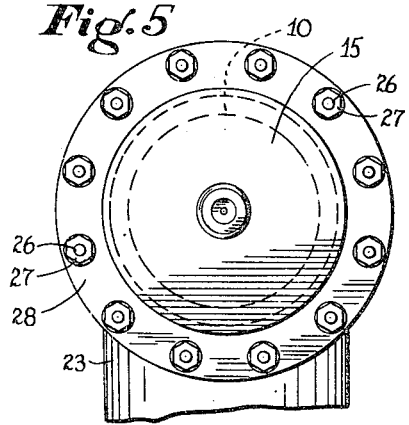
Fig. 5 is an end elevational view taken on line 5—5 of Fig. 1.

The pipe hinges 4 and 4a of Fig. 6 are alike and each is quite like hinge 2 which has just been described. Substantially the only difference between hinges 2 and 4 or 4a is that hinges 4 and 4a include two pipes entering the sleeve from opposite ends of the hinge rather than the one pipe of hinge 2. One of these pipes 30 corresponds to pipe 10 of hinge 2 but is open at the end where pipe 10 is closed and has interior screw threads 31. Pipe 32 projects into pipe 30, has an exterior annular shoulder 33 at its inner end and carries a ring 35 which is exteriorly screw threaded to engage threads 31 on pipe 30. Packing 36 between shoulder 30 and the adjacent end of ring 31 serves to prevent the escape of fluid under pressure between these two pipes. Pipes 30 and 32 may be connected as by weld metal 37 and 38 to tubes 5, and projections 11 of the pipe hinges 4 and 4a are connected to pipe 3 and 6 respectively.

When pipes 30 and 32 are connected together in the illustrated telescopic position and are mounted in sleeve 11, these pipes on the one hand and the sleeve on the other hand are capable of relative rotational movement but are incapable of relative axial movement, as described above in connection with hinge 2.

If it is desired to eliminate one of tubes 5 of Figs. 1, 2 and 3, pipe hinges 2 may be substituted for hinges 4 and 4a.

Figure 7:
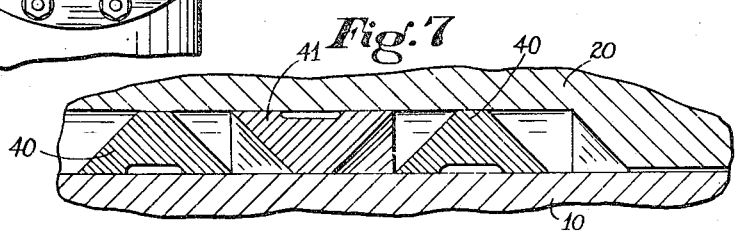

Fig. 7 shows one form of packing which is suitable for use with the hinges of this invention. This packing consists of three axially arranged, metallic rings having triangular cross-sections with their side surfaces inclined at angles of approximately 45 degrees to their bases. Sleeve 11 and retainer 13 have similarly inclined surfaces. Thus, the rings, sleeve and retainer make close fitting engagement. The two outer rings 40 are preferably composed of a non-scoring bronze while the middle ring 41 is composed of soft steel, but other metal packing rings may be used which will retain their shape and resist deterioration of the temperatures to which they are subjected in the use of the hinge.

Figure 8:
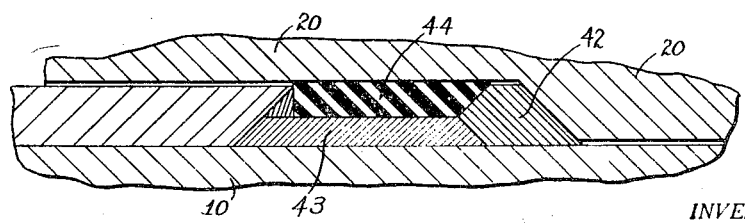

In Fig. 8 the packing 12 consists of an end ring 42 which may consist of soft steel, an inner ring 43 which may be of non-scoring bronze, and an outer ring 44 which surrounds ring 43 and which may consist of any of the well known so-called plastic materials which are capable of retaining their shape and resisting deterioration at red heats.

Figure 9:
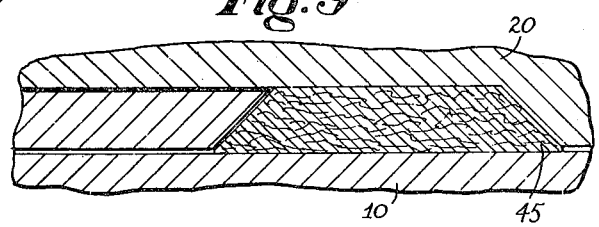
Figs. 7, 8 and 9 are fragmentary sectional views of three different types of packing which may be used with the pipe hinge of Figs. 4 and 5.

Figure 9 shows packing 45 which may be of the bulk or braided type and may include abestos fiber when the temperatures to which it is subjected in use are not sufficiently high to cause it to deteriorate.

It will be understood by those skilled in the art from the foregoing specification and drawings that the present invention makes it possible to reduce the thickness, weight, length and cost of piping, particularly on shipboard, and thereby to increase correspondingly the space available for other cargo or to increase the speed or cruising distance of the ship. Furthermore, this invention, by eliminating bending forces, reactions and stresses in high pressure piping, avoids the present-day uncertainty as to fatigue accompanying reversed cyclic stresses and thereby assures that piping of sufficient wall thickness and strength to withstand the stresses caused by pressure and its own weight will be satisfactory under all expected expansions and contractions and shifting of anchor points. The simplicity of the various parts of hinges embodying the present invention is reflected in lowered costs of initial construction and the rapidity with which the piping may be erected or dismantled for inspection, cleaning or replacement.

Having thus described my invention so that others skilled in the art may be able to understand and practice the same, I state that what I desire to secure by Letters Patent is defined in what is claimed.

What is claimed is:

1. Means for connecting two pipes for limited relative movement to compensate for expansion and contraction due to high pressure, high temperature fluid flow therethrough, comprising an elbow-like coupling consisting of a pipe having an opening in its side wall and annular bearing surfaces on its outer surface on opposite sides of said opening, a sleeve surrounding said pipe, said sleeve having a laterally extending projection with a single passage therein and having inner annular bearing surfaces closely engaging said bearing surfaces on said pipe, said opening and passage being in communication during relative rotation of the pipe and sleeve through an angle substantially less than 180°, packing pressing with fluid sealing contact on the pipe and sleeve axially outside of the interengagement of said bearing surfaces, and means providing for limited relative rotational movement, while preventing relative axial movement of said pipe and sleeve.

2. In combination a high fluid pressure system, means for connecting two conduits subject to substantial contraction and expansion, said means comprising two hinges and two tubes, each hinge comprising an elbow-like coupling consisting of a pipe connected at one end to one of said tubes and having an opening in its side wall and annular bearing surfaces on its outer surface on opposite sides of said opening, a second pipe projecting into the open end of said first pipe, a sleeve surrounding said first pipe, said sleeve having a laterally extending projection with a single passage therein, and having inner annular bearing surfaces closely engaging said bearing surfaces on said first pipe, said opening and passage being in communication during relative rotation of the pipe and sleeve through an angle substantially less than 180°, packing pressing with fluid sealing contact on said first pipe and sleeve axially outside of the interengagement with said bearing surfaces, and means providing for limited relative rotational movement, while preventing relative axial movement of said pipe and sleeve.

JAMES CLARENCE HOBBS.

REFERENCES CITED

The following references are of record in the file of this patent:

UNITED STATES PATENTS

| Number | Name | Date |
| --- | --- | --- |
| 1,523,822 | Marret | Jan. 20, 1925 |
| 1,805,335 | Kermode et al. | May 12, 1931 |
| 1,985,012 | Boehm | Dec. 18, 1934 |